United States Patent [19]
Tsutsui et al.

[11] Patent Number: 5,832,426
[45] Date of Patent: Nov. 3, 1998

[54] HIGH EFFICIENCY AUDIO ENCODING METHOD AND APPARATUS

[75] Inventors: Kyoya Tsutsui; Osamu Shimoyoshi, both of Kanagawa, Japan

[73] Assignee: Sony Corporation, Tokyo, Japan

[21] Appl. No.: 568,481

[22] Filed: Dec. 7, 1995

[30] Foreign Application Priority Data

Dec. 15, 1994 [JP] Japan .................................. 6-311801

[51] Int. Cl.⁶ .............................. G10L 3/02; G10L 9/00
[52] U.S. Cl. ......................... 704/229; 704/230; 704/228
[58] Field of Search ................................ 395/2.38, 2.39, 395/2.37, 2.13; 704/229, 230

[56] References Cited

U.S. PATENT DOCUMENTS

| | | |
|---|---|---|
| 3,349,183 | 10/1967 | Campanella . |
| 4,184,049 | 1/1980 | Crochiere et al. ..................... 179/1 SA |
| 4,485,337 | 11/1984 | Sandusky ................................ 318/314 |

(List continued on next page.)

FOREIGN PATENT DOCUMENTS

| | | | |
|---|---|---|---|
| 0 349 325 A2 | 1/1990 | European Pat. Off. | ......... G11B 20/10 |
| 0 370 277 A3 | 5/1990 | European Pat. Off. | .......... H04B 1/66 |
| 0 423 050 A1 | 4/1991 | European Pat. Off. | .......... H04B 1/66 |
| 0 446 031 A3 | 9/1991 | European Pat. Off. | .......... H04B 1/66 |
| 0 458 645 A2 | 11/1991 | European Pat. Off. | .......... H04B 1/66 |
| 0 463 473 A2 | 1/1992 | European Pat. Off. | ...... G06F 15/332 |
| 0 466 190 A2 | 1/1992 | European Pat. Off. | ......... G11B 20/10 |
| 0 473 367 A1 | 3/1992 | European Pat. Off. | .......... H03M 7/30 |
| 0 506 394 A2 | 9/1992 | European Pat. Off. | .......... G10L 7/00 |
| 3933974 A1 | 10/1989 | Germany | ..................... G11B 19/247 |
| A 01 069 181 | 3/1989 | Japan | .............................. H04N 7/137 |
| 2-220271 | 9/1990 | Japan | .............................. G11B 20/14 |
| WO 90/09064 | 8/1990 | WIPO | .............................. H04B 1/66 |
| WO 91/16769 | 10/1991 | WIPO | .............................. H04B 1/66 |
| WO 92/17884 | 10/1992 | WIPO | ............................. G11B 20/10 |

OTHER PUBLICATIONS

Stremler, F. G., Introduction to Communication Systems, 3rd. Ed., Addison–Wesley, pp. 4–6, Oct. 1992.

An application–specific FFT processor Electronic Engineering, Jun. 1988 pp. 100 and 104–106.

Adaptive Transform Coding of Speech Signals, Selinski et al. IEEE 1977, vol. ASSP–25, No. 4, pp. 299–309.

Application of Quadrature Mirror Filers To Split Band Voice Coding Schemes, Esteban et al., 1977 IEEE International Conference on Acoustics, Speech & Signal Processing, pp. 191–195.

An Application Specific DSP Chip for 100 MHZ Data Rates, Mager et al., IEEE 1988—p. 1989–1992.

(List continued on next page.)

*Primary Examiner*—David R. Hudspeth
*Assistant Examiner*—R. L. Sax
*Attorney, Agent, or Firm*—Limbach & Limbach L.L.P.

[57] ABSTRACT

A method and apparatus for high efficiency encoding of digital data whereby input digital data may be encoded by so-called high efficiency encoding. The high efficiency device includes a signal component encoding circuit including in turn a bandwidth storage circuit 62 for holding the information on the playback band of a previous block, that is the information on the bandwidth of bit allocation performed in the previous block, or the value of the number of the playback encoding units, and a control circuit 63 for deciding the number of playback encoding units of the current block based upon the playback band information, that is the value of the number of the playback encoding units, in the previous block, held by the bandwidth storage circuit 62. Since the stable playback bandwidth is maintained, and there is no risk of the playback band being frequently changed from one block to another, the harsh sounding noise otherwise produced by the appearance and disappearance of high-range side signals is not produced, so that deterioration in the perceived sound quality may be suppressed to a minimum with an insufficient bit rate.

9 Claims, 7 Drawing Sheets

U.S. PATENT DOCUMENTS

| | | | |
|---|---|---|---|
| 4,516,241 | 5/1985 | Farah et al. | 370/110.1 |
| 4,535,472 | 8/1985 | Tomcik | 381/31 |
| 4,569,058 | 2/1986 | Grallert | 375/27 |
| 4,573,187 | 2/1986 | Bui et al. | 381/43 |
| 4,622,598 | 11/1986 | Doi et al. | 360/22 |
| 4,625,286 | 11/1986 | Papamichalis et al. | 364/513.5 |
| 4,669,120 | 5/1987 | Ono | 381/40 |
| 4,697,212 | 9/1987 | Osawa et al. | 360/48 |
| 4,706,265 | 11/1987 | Furukawa | 375/122 |
| 4,748,579 | 5/1988 | Zibman et al. | 364/736 |
| 4,873,589 | 10/1989 | Inazawa et al. | 360/53 |
| 4,882,754 | 11/1989 | Weaver et al. | 381/35 |
| 4,885,790 | 12/1989 | McAulay | 381/36 |
| 4,903,301 | 2/1990 | Kondo et al. | 381/30 |
| 4,908,810 | 3/1990 | Oie | 369/50 |
| 4,912,763 | 3/1990 | Galand et al. | 381/31 |
| 4,932,062 | 6/1990 | Hamilton | 381/43 |
| 4,949,383 | 8/1990 | Koh et al. | 381/31 |
| 4,972,484 | 11/1990 | Theile et al. | 381/37 |
| 5,016,107 | 5/1991 | Sasson et al. | 358/209 |
| 5,040,217 | 8/1991 | Brandenburg et al. | 381/47 |
| 5,045,812 | 9/1991 | Tateishi | 331/10 |
| 5,109,417 | 4/1992 | Fielder et al. | 381/36 |
| 5,150,387 | 9/1992 | Yoshikawa | 375/122 |
| 5,159,611 | 10/1992 | Tomita et al. | 375/34 |
| 5,185,800 | 2/1993 | Mahieux | 381/29 |
| 5,204,677 | 4/1993 | Akagiri et al. | 341/118 |
| 5,218,561 | 6/1993 | Iwadare | 364/725 |
| 5,222,189 | 6/1993 | Fielder | 395/2 |
| 5,241,603 | 8/1993 | Akagiri et al. | 381/37 |
| 5,243,588 | 9/1993 | Maeda et al. | 369/54 |
| 5,264,846 | 11/1993 | Oikawa | 341/76 |
| 5,268,685 | 12/1993 | Fujiwara | 704/229 |
| 5,285,476 | 2/1994 | Akagiri et al. | 375/25 |
| 5,294,925 | 3/1994 | Akagiri | 341/50 |
| 5,301,205 | 4/1994 | Tsutsui et al. | 375/1 |
| 5,311,561 | 5/1994 | Akagiri | 375/122 |
| 5,381,143 | 1/1995 | Shimoyoshi et al. | 341/51 |
| 5,388,093 | 2/1995 | Yoshida et al. | 369/124 |
| 5,388,209 | 2/1995 | Akagiri | 395/2.38 |
| 5,406,428 | 4/1995 | Suzuki | 360/53 |
| 5,461,378 | 10/1995 | Shimoyoshi et al. | 341/51 |
| 5,471,558 | 11/1995 | Tsutsui | 704/229 |

OTHER PUBLICATIONS

Perceptual Transform Coding of Wideband Stereo Signals, James D. Johnston, ICASSP '89, vol. 3, pp. 1993–1996.

Signal Compression: Technology Targets and Research Directions, Nikil Jayant, IEEE vol. 10, No. 5, pp. 796–818.

R.E. Crochiere et al; Digital Coding of Speech in Sub–Bands, 55 Bell Syst. TechJ. No. 8 (1976), pp. 1069–1085.

J.H. Rothweiler, "Polyphase Quadrature Filters—A New Subband Coding Technique", ICASSP 83, Boston, pp. 1280–1283.

J.P. Princen and A.B. Bradley, "Subband Transform Coding Using Filter Bank Based on Time Domain Aliasing Cancellation", ICASSP 1987; pp. 2161–2164.

IEEE Transactions on Acoustics, Speech, and Signal Processing, vol. ASSP–25, No. 4, Aug. 1977.

M.A. Krassner, The Critical Band Encoder—Digital Encoding of the Perceptual Requirements of the Auditory System, ICASSP 1980.

U.S. application No. 08/374,518, Tsutsui et al., filed Mar. 20, 1995.

HIGH EFFICIENCY AUDIO ENCODING METHOD AND APPARATUS

BACKGROUND OF THE INVENTION

1. Field of the Invention

This invention relates to a method and apparatus for high efficiency encoding of digital data whereby input digital data may be encoded by so-called high efficiency encoding.

2. Description of the Related Art

There exist a variety of high efficiency encoding techniques of encoding audio or speech signals. Examples of these techniques include blocking transform coding in which time-domain signals representing the audio signal on the time axis are divided into plural unit time blocks and the block-based time-domain signals are transformed by orthogonal transform into frequency-domain signals, which are encoded, and a non-blocking sub-band coding in which the frequency spectrum of the time-domain audio signal is divided by a filter bank into a plurality of sub-bands without forming the signal into unit time blocks along the time axis prior to coding. There is also known a combination of sub-band coding and transform coding, in which time-domain audio signals are divided into a plurality of frequency ranges by sub-band coding, and transform coding is applied to each of the frequency ranges.

Among the filters for dividing a frequency spectrum into a plurality of equal-width frequency ranges include the quadrature mirror filter (QMF) as discussed in R. E. Crochiere, Digital Coding of Speech in Sub-bands, 55 Bell Syst. Tech J. No.8 (1976). With such QMF filter, the frequency spectrum of the signal is divided into two equal-width bands. With the QMF, aliasing is not produced when the frequency bands resulting from the division are subsequently combined together.

In "Polyphase Quadrature Filters—A New Subband Coding Technique", Joseph H. Rothweiler, ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the input audio signal into unit time blocks each being of a predetermined time duration, and processing the resulting time blocks using a discrete Fourier transform (DFT), discrete cosine transform (DCT) and modified DCT (MDCT) for converting the signal from the time axis to the frequency axis. Discussions on MDCT may be found in J. P. Princen and A. B. Bradley, "Subband Transform Coding Using Filter Bank Based on Time Domain Aliasing Cancellation", ICASSP 1987.

By quantizing the signals divided on the band basis by the filter or orthogonal transform, it becomes possible to control the band subjected to quantization noise, and psychoacoustically more efficient coding may be realized by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use subbands that take advantage of the psychoacoustic characteristics of the human auditory system. That is, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantized using an adaptively allocated number of bits.

There are presently known the following two bit allocation techniques. For example, in IEEE Transactions of Acoustics, Speech and Signal Processing, vol. ASSP-25, No.4, August 1977, bit allocation is carried out on the basis of the amplitude of the signal in each critical band. This technique produces a flat quantization noise spectrum and minimizes the noise energy, but the noise level perceived by the listener is not optimum because the technique does not effectively exploit the psychoacoustic masking effect.

In the bit allocation technique described in M. A. Krassner, The Critical Band Encoder—Digital Encoding of the Perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a sine wave signal, non-optimum results are obtained because of the fixed allocation of bits among the critical bands.

For overcoming these inconveniences, a high efficiency encoding apparatus (encoder) has been proposed in which the total number of bits available for bit allocation is divided between (1) a fixed bit allocation pattern pre-set for each small block, and (2) a block-based signal magnitude dependent bit allocation. The division ratio is set based upon a signal which is relevant to the input signal, such that the smoother the signal spectrum, the higher becomes the division ratio for the fixed bit allocation pattern.

With this technique, if the energy is concentrated in a particular spectral component, as in the case of a sine wave input, a larger number of bits are allocated to the block containing the spectral component, for significantly improving the signal-to-noise characteristics in their entirety. Since the human auditory system is highly sensitive to a signal having acute spectral components, such technique may be employed for improving the signal-to-noise ratio for improving not only measured values but also the quality of the sound as perceived by the listener.

In addition to the above techniques, a variety of other techniques have been proposed, and the model simulating the human auditory system has been refined, such that, if the encoding device is improved in its ability, encoding may be made with higher efficiency in light of the human auditory system.

The present Assignee has already proposed in International Patent Application, International Application No.94/28633, corresponding U.S. application Ser. No. 08/374,518 and in corresponding European Patent 0653846, an encoding method consisting of separating acoustically crucial tonal components from spectral signals and encoding these tonal components independently of the remaining spectral components. This enables efficient encoding of audio signals with a high compression ratio without substantially producing acoustic deterioration of audio signals.

If DFT or DCT is utilized as the method for transforming the waveform signal into a spectral signal, and transform is executed using a time block made up of M samples, M independent real-number samples are produced. Since a given block is usually overlapped by M1 samples with both neighboring blocks for reducing connection distortion between time blocks, M real-number data are quantized and encoded in DFT or DCT for (M–M1) samples.

On the other hand, if the waveform signal is transformed into a spectral signal by MDCT, since M independent real-number data are produced from 2M samples having M samples each overlapped with both neighboring samples, M real-number data are quantized and encoded in MDCT for M samples. In a decoding device, the coded data from MDCT are inverse-transformed at each block to produce waveform elements which are summed together with interference with one another to reconstruct the waveform signal.

If the time block length for transform is increased, the frequency resolution is increased, so that the energy is concentrated in a specified spectral component. For this reason, by employing MDCT in which transform is executed with a long block length resulting from half-overlap with both neighboring blocks, and the number of the resulting spectral signals is not increased as compared to the number of the original time samples, the encoding may be achieved with high efficiency than with the use of DFT or DCT. The inter-block distortion of the waveform signal may be reduced by overlapping neighboring blocks with a long overlap length.

However, if the audio waveform signals are encoded on the block basis, the number of bits for encoding required for achieving the satisfactory sound quality differs in dependence upon characteristics of waveform signals, such as level or spectral distribution in each block. For example, when encoding is to be performed with a fixed bit rate of allocating the same number of bits to each block, there are generated blocks in which the number of bits required for attaining the satisfactory sound quality cannot be maintained with a decreasing bit rate.

Heretofore, if such block incapable of maintaining the required number of bits is generated, it is known to decrease the quantization fineness of each band substantially uniformly as described e.g., in U.S. Pat. No. 4,972,484. However, with this technique, if the bit rate is particularly low and the frequency components of the respective bands are quantized in three to seven stages, the quantization noise is excessively increased, thus producing apparent deterioration in sound quality.

Another known method for coping with shortage in the number of bits for encoding is to curtail the high-range frequency components in a given block and to narrow the playback band which will be subsequently reproduced. With this method, since sufficient quantization fineness may be assured for perceptionally critical low-range signals, the sound quality better than that with the method of substantially uniformly lowering the quantization fineness of the respective bands may be achieved even with the low bit rate.

However, if the bandwidth to be reproduced is determined in this manner from block to block, harsh sounding noise tends to be produced due to modulation of the frequency components reproduced or not reproduced from block to block.

SUMMARY OF THE INVENTION

It is therefore an object of the present invention to provide a perceptionally excellent high efficiency encoding method for speech signals employing a smaller number of bits.

In one aspect, the present invention provides a high efficiency encoding method in which, for dividing the speech signal into blocks each consisting of plural frequency component signals and encoding the frequency component signals in each block, the bandwidths of frequency bands in which to perform bit allocation (the bandwidth for which signal reproduction will be performed subsequently) are varied on the block basis. The bandwidth in which to perform bit allocation for the current block is determined based upon information on the bandwidth of bit allocation performed on plural temporally previous blocks (bandwidth for which signal reproduction will be subsequently performed).

Preferably, the decision of the bandwidth of bit allocation performed in the current block is given in dependence upon the information on the bandwidth of the block which permits bit allocation (reproducible bandwidth or bandwidth which permits signal reproduction).

The bandwidth of bit allocation performed in the current block is increased when the frequency component signal level in a band of an enlarged bandwidth is smaller than a pre-set value or when the frequency component signal level of a range higher than the bandwidth of bit allocation performed in the previous block is smaller than a pre-set value.

In another aspect, the present invention provides a high efficiency encoding device including block frequency component signal generating means for splitting a waveform signal into blocks each containing plural frequency component signals, and frequency component signal encoding means for encoding the frequency component signals in the blocks, in which, when encoding the frequency component signals in the blocks, the bandwidth of block-based bit allocation is varied in dependence upon characteristics of the waveform signal. The frequency component signal encoding means includes bandwidth information holding means for holding the information on the bandwidth of bit allocation performed on temporally previous plural blocks and bandwidth decision means for deciding the bandwidth of bit allocation of the current block based on the information on the bandwidth of bit allocation in the previous blocks held by the bandwidth information holding means.

The bandwidth decision means decides the bandwidth of bit allocation performed in the current block in dependence upon the information on the bandwidth of the block which permits bit allocation. It is when the frequency component signal level in a band of an enlarged band is smaller than a pre-set value or when the frequency component signal level of a range higher than the bandwidth of bit allocation performed in the previous block is smaller than a pre-set value that the bandwidth decision means enlarges the bandwidth of bit allocation in the current block.

The waveform signal is an acoustic signal.

According to the present invention, stable playback bandwidths are maintained by deciding the bandwidth of each block by having reference to the bandwidth decided in the previous block, whereby the above-mentioned harsh sounding noise may be prohibited form occurring.

DESCRIPTION OF THE PREFERRED EMBODIMENTS

Figure 1:
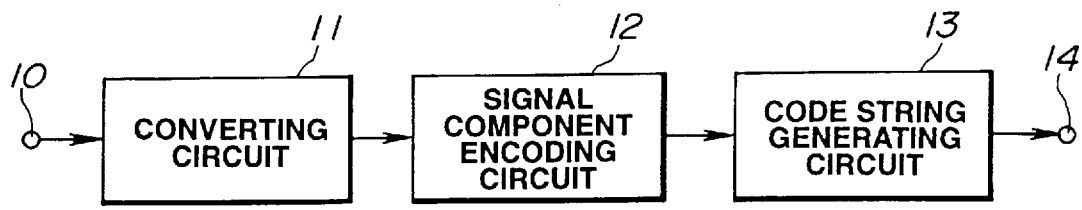
FIG. 1 is a block circuit diagram showing a basic arrangement of a high-efficiency encoding device embodying the present invention.

Referring to the drawings, preferred embodiments of the present invention will be explained in detail.

FIG. 1 shows a basic arrangement of a high-efficiency encoding apparatus (encoder) for acoustic waveform signals according to an embodiment of the present invention.

In the encoder shown in FIG. 1, waveform signals, such as acoustic signals, entered via an input terminal 10, are converted by a transform circuit 11 into frequency spectral components which are fed to a signal component encoding circuit 12 for encoding. An output of the signal component encoding circuit 12 is fed to a code string generating circuit 13 where a code string is generated. The code string thus formed is outputted at an output terminal 14.

Figure 2:
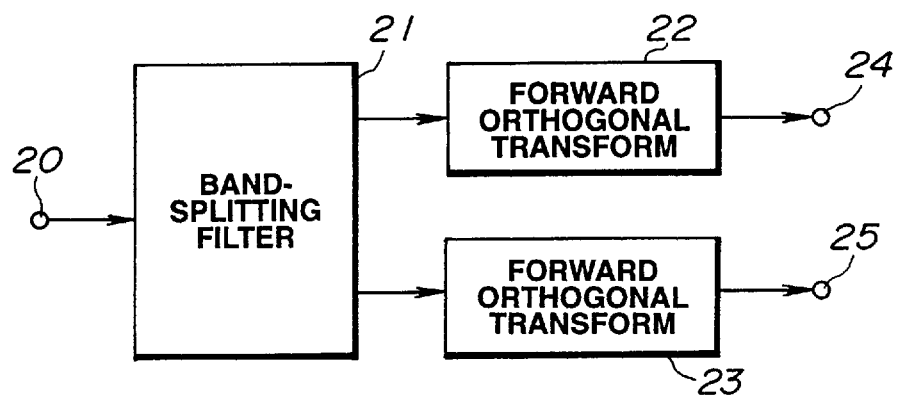
FIG. 2 is a block circuit diagram showing an arrangement of an illustrative example of a converting circuit of the high efficiency encoding device shown in FIG. 1.

FIG. 2 shows an arrangement of the transform circuit 11 shown in FIG. 1.

Referring to FIG. 2, waveform signals entering an input terminal 20 are split by a band splitting filter 21 into two frequency bands. The bandwidths of two frequency bands, outputted by the band splitting filter 21, are reduced by decimation to one-half the bandwidth of the waveform signals supplied to the input terminal 20. The signals of these two frequency bands are fed to respective forward orthogonal transform circuits 22, 23 for orthogonal transform, such as MDCT. The spectral components from the orthogonal transform circuits 22, 23 are outputted via associated output terminals 24, 25 as spectral components from the transform circuit 11 of FIG. 1 so as to be transmitted to the downstream side signal component encoding circuit 12 shown in FIG. 1. In FIG. 1, the spectral components of the two frequency bands from the forward transform circuits 22, 23 are shown as a sole output of the signal component encoding circuit 12.

The transform circuit 11 may be arranged in a manner different from the above-described illustrative arrangement. For example, the input signals may be directly transformed by MDCT into spectral components. The input signals may be transformed by DFT or DCT instead of by MDCT. Meanwhile, the input signals may be split into band components solely by a so-called band splitting filter. However, since the meritorious effect of the high-efficiency encoding method of the present invention is displayed most prominently in the case of encoding signals exhibiting energy concentration in specified frequencies, the above-described orthogonal transform capable of producing numerous frequency components with a relatively small amount of the processing operations is most preferred for transforming waveform signals into frequency components.

Figure 3:
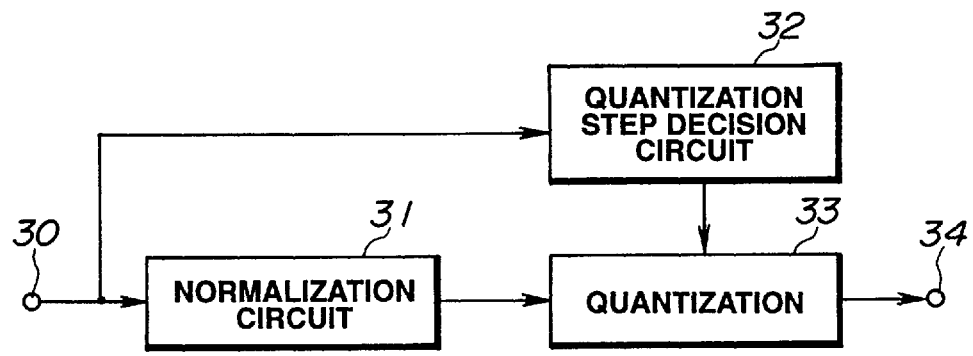
FIG. 3 is a block circuit diagram showing a general arrangement of a signal component encoding circuit of the high efficiency encoding device shown in FIG. 1.

FIG. 3 shows a basic arrangement for encoding spectral components in the signal component encoding circuit 12 shown in FIG. 1.

Referring to FIG. 3, the respective frequency spectral components supplied from the transform circuit 11 via an input terminal 30 are normalized by a normalization circuit 31 from band to band and thence routed to a quantization circuit 33. The frequency spectral components from the input terminal 30 are also routed to a quantization step decision circuit 32 where the frequency fineness information is calculated based upon the spectral components. The quantization circuit 33 quantizes the signals normalized signals from the normalization circuit 31 in accordance with the quantization fineness information calculated by the quantization step decision circuit 32. The quantization circuit 33 outputs, in addition to the quantized signal components, the normalization coefficient information, that is encoded data of the number of normalization coefficients used in the normalization circuit 31, and the quantization fineness information calculated by the quantization step decision circuit 32. These encoded data are outputted at an output terminal 34. An output of the output terminal 34 is routed to the codestring generating circuit 13 of FIG. 1.

Figure 4:
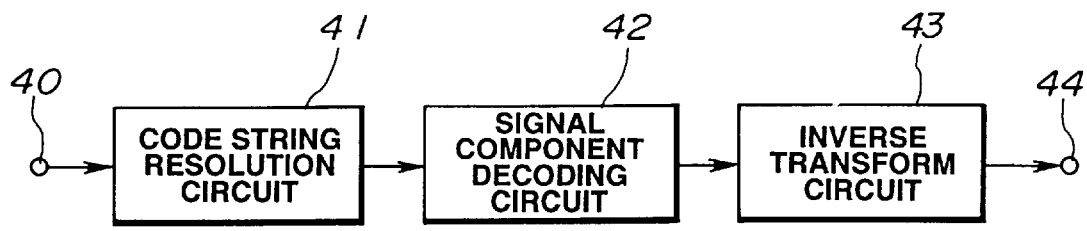
FIG. 4 is a block circuit diagram showing the basic arrangement of a high efficiency decoding circuit for resolving and encoding a code string obtained on encoding by the high efficiency encoding method or device of the present invention.

FIG. 4 shows a basic arrangement of a high efficiency decoder (decoding apparatus) for reproducing acoustic signals from the codestring generated by the high efficiency encoding circuit of FIG. 1 and for outputting the reproduced acoustic signals.

Referring to FIG. 4, the code string generated by the high efficiency encoder and transmitted via a transmission or recording medium is routed to an input terminal 40. This code string is sent to a code string resolving circuit 41, where the codes of the respective signal components are extracted. The extracted codes of the respective signal components are sent to a signal component decoding circuit 42. The signal component decoding circuit 42 decodes the codes of the respective signal components. These original spectral components are fed to an inverse transform circuit 43 so as to be inverse transformed into acoustic waveform signals, which are outputted via an output terminal 44.

The recording medium may be exemplified by a tape-shaped recording medium, e.g., an optical disc, a magneto-optical disc or a magnetic disc, a semiconductor memory or an IC card. The transmission medium may be exemplified by an electric cable, an optical cable or electrical waves.

Figure 5:
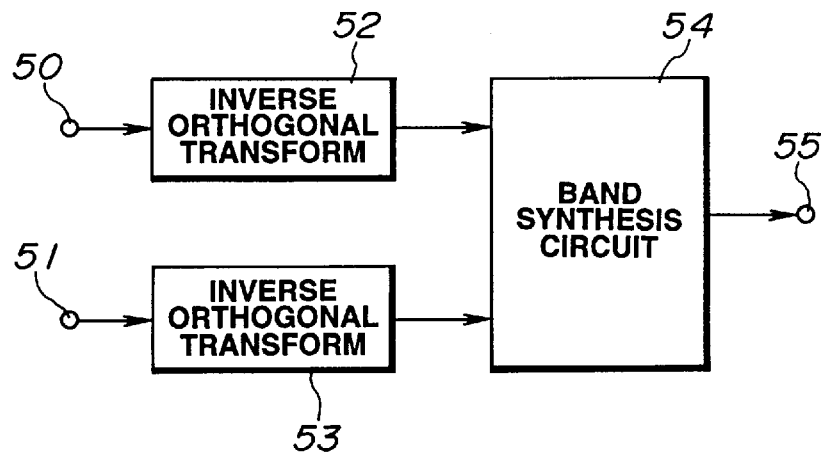
FIG. 5 is a block circuit diagram showing an arrangement of an illustrative example of an inverse transform circuit of a decoding circuit.

FIG. 5 shows an arrangement of an illustrative example of the inverse transform circuit 43 shown in FIG. 4. The inverse transform circuit 43 of FIG. 5 performs an inverse transform operation which is the reverse of the transform operation performed by the transform circuit of FIG. 2.

Referring to FIG. 5, the spectral components for the above two frequency bands, restored by the signal component decoding circuit 42 of FIG. 4, are sent via input terminals 50, 51 to associated inverse orthogonal transform circuits 52, 53, respectively, for inverse orthogonal transform. The signals of the respective frequency bands, inverse transformed by the inverse transform circuits 52, 53, are routed to a band synthesis filter 54 where they are band-synthesized and outputted via an output terminal 55.

Since the basic arrangements and the basic operation of the high efficiency encoder and the high efficiency decoder of the present invention have been described as above, the high efficiency encoding method and the high efficiency decoding method of the present invention will now be explained in connection with the conventional high efficiency encoding method which is given by way of comparison.

Figure 6:
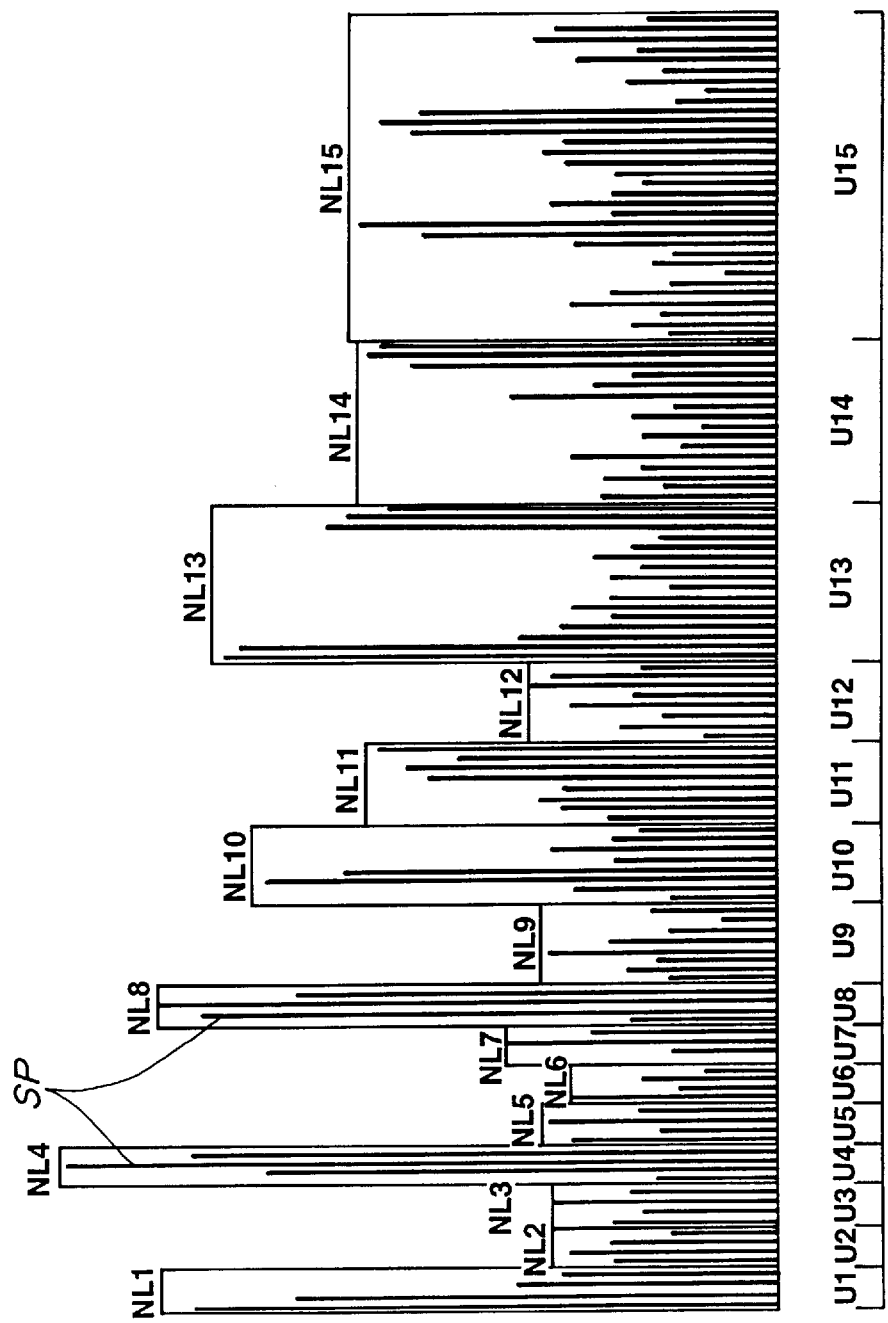
FIG. 6 is a graph showing the relation between the encoding units and the spectral signal components employed for illustration of the encoding method according to the present invention.

Referring to FIG. 6, the conventional high efficiency encoding method, as applied to the arrangements shown in FIGS. 1 to 3, is explained.

FIG. 6 shows spectral components SP obtained as a result of transforming input speech signals by a transform circuit 11 shown for example in FIG. 2. In the example of FIG. 6, the levels of absolute values of the spectral components obtained by MDCT are represented in terms of decibels (dB). That is, the transform circuit 11 transforms the input signal into e.g., 128 spectral components SP from one time block to another.

The spectral components SP from the transform circuit 11 are sent to the signal component encoding circuit 12 shown in FIG. 3. The signal component encoding circuit 12 groups the 128 spectral components SP from the transform circuit 11 into pre-set bands U1 to U15 as shown in FIG. 6. These bands are herein termed encoding blocks. The spectral components SP of the respective encoding blocks are normalized with normalization coefficients NL1 to NL15 associated with the encoding blocks U1 to U15. The normalized spectral components SP of the respective encoding blocks are quantized. The bandwidths of the respective encoding blocks in the respective blocks are selected to be narrower and broader towards the low and high frequency ranges, respectively, for enabling generation of the quantization noise to be controlled in keeping with psychoacoustic characteristics of the human auditory sense.

The quantization fineness information required in each encoding unit may be found by calculating the minimum audibility level or the masking level in a band associated with each critical band based upon e.g., a model for the auditory sense. However, since the masking level differs in dependence upon the energy distribution of the input waveform signals, the quantization fineness required in each encoding unit differs from block to block and hence the sum of the numbers of the quantization bits required for assuring satisfactory sound quality differs from block to block.

Thus, in case of the fixed bit rate encoding of allocating the same number of bits to the respective blocks, it may occur with the decreasing bit rate that, in certain blocks, the number of bits required for attaining satisfactory sound quality cannot be maintained, as previously stated. Heretofore, if such block incapable of maintaining the required number of bits is generated, it has been known to decrease the quantization fineness of each band substantially uniformly as described e.g., in the above-mentioned U.S. Pat. No. 4,972,484. However, with this method, if the bit rate is particularly low and the frequency components of the respective bands are quantized in three to seven stages, the quantization noise becomes excessive thus producing apparent deterioration in sound quality. Another known method for coping with shortage in the number of bits for encoding is to curtail the high-range frequency components in a given block and to narrow the playback frequency band, that is to narrow the frequency band which will be subsequently reproduced by not allocating bits to and not transmitting the high-range frequency components. With this method, since sufficient quantization fineness may be assured for perceptionally critical low-range signals, sound quality better than that with the method of substantially uniformly lowering the quantization fineness of the respective bands may be achieved even with the low bit rate. However, if the bandwidth of the frequency bands to be reproduced is determined from block to block, the number V of reproducible encoding units is changed from one time block to another, as shown by hatched lines in FIG. 7, so that the harsh sounding noise tends to be produced due to modulation of the frequency components reproduced or not reproduced from block to block.

In consideration of this, with the high efficiency encoding method of the present invention, the number V of the reproducible units, thus determined, is not directly set as the number of playback encoding units. Instead, the number of playback encoding units W for the current block is determined based upon the past hysteresis, that is the number of playback encoding units of the previous block.

Figure 9:
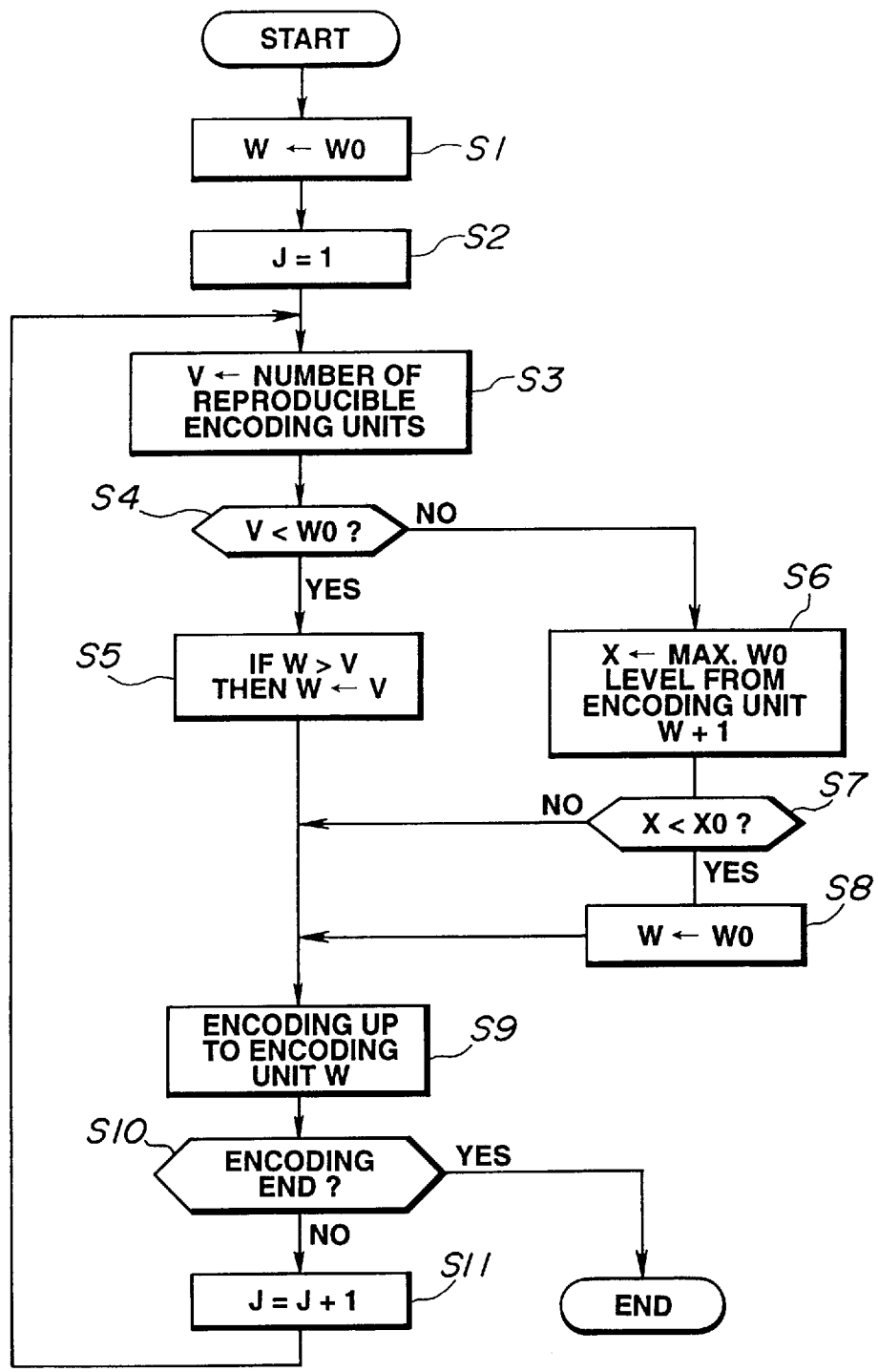
FIG. 9 is a flowchart for illustrating the processing sequence of the high efficiency encoding method according to the present invention.

In FIG. 9, there is shown a flowchart for illustrating the method for deciding the number of playback encoding units based upon the past hysteresis in the encoding method of the present invention.

Referring to FIG. 9, before encoding an input waveform signal, the default value of the number of playback encoding units W0 is set as the number of playback encoding units W. At step S2, the number of blocks J is set to 1. At step S3, the number of reproducible encoding units V is calculated. At step S4, the number of reproducible encoding units V is compared to the so-far set number of playback encoding units W.

If, as a result of comparison at step S4, the value of V is smaller than that of W0, the program transfers to step S5. Only if the value of V is smaller at this time than W, the value V is set as a new number of playback encoding units. The program then transfers to step S9. If, as a result of comparison at step S4, the value of V assumes a value larger than or equal to the value of W0, the program transfers to step S6, where the maximum level X of W0 is calculated from the encoding unit (W+1). At the next step S7, this value X is compared to a pre-set value X0. However, a normalization coefficient as an approximate value of the maximum level may also be used as the value X.

If, as a result of comparison at step S7, the value of X is smaller than the value X0, the program transfers to step S8, where the number of playback encoding units W is set as the default value W0 before the program transfers to step S9. If, as a result of comparison at step S7, the value of X is not smaller than the value X0, the program transfers to step S8 without changing the value of W.

At step S9, the spectral signal components up to the band of the encoding unit of the value W are encoded. However, since the value W is not larger than the value V, the bits allocated for encoding the spectral signal components contained from the encoding unit (W+1) up to the encoding unit V may be re-allocated to the encoding units up to the encoding unit W before proceeding the encoding.

At the next step S10, it is judged whether or not encoding may be terminated for the block. If the result of judgment at step S10 is NO, the program transfers to step S11 where the block number for the next block processing is incremented. The program then returns to step S3 to repeat the above processing.

Figure 7:
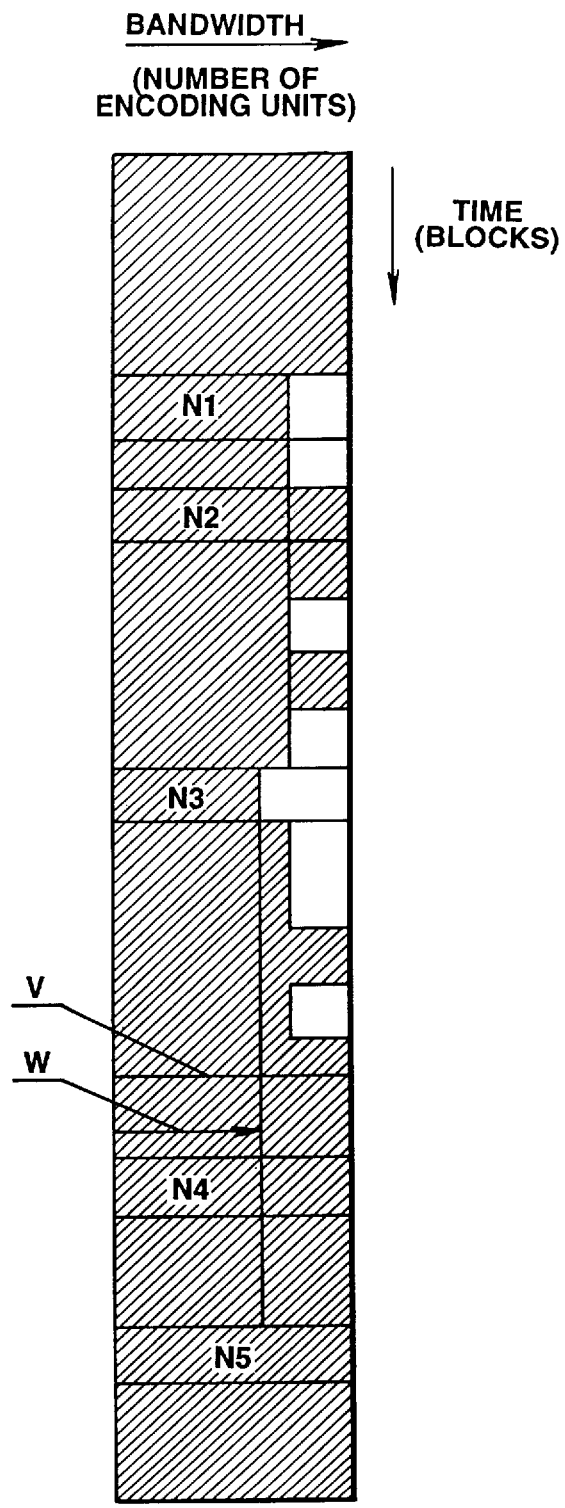
FIG. 7 is a diagrammatic view for illustrating the encoding method of the present invention in comparison with the conventional encoding method.
Figure 8:
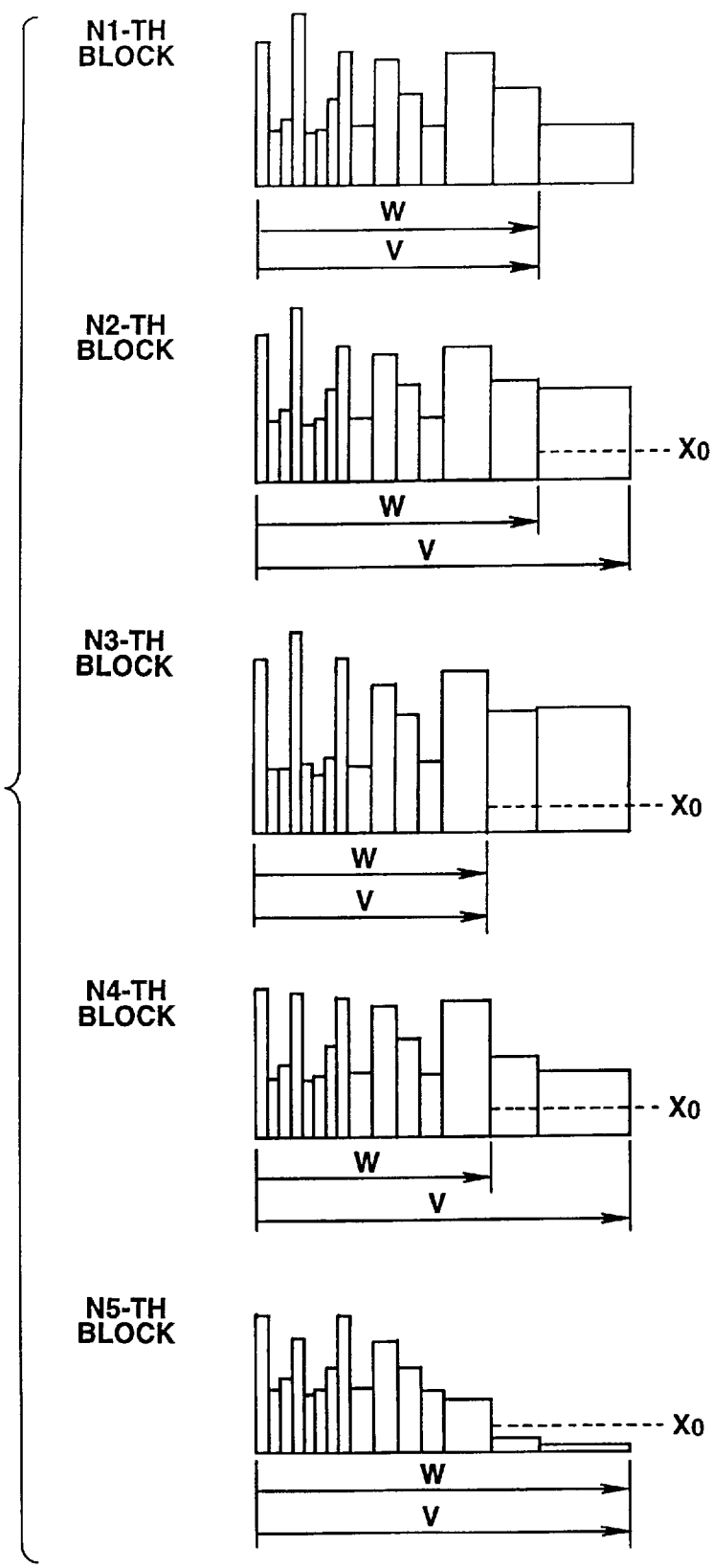
FIG. 8 illustrates the relation between the normalization coefficients of the encoding units of the respective blocks, number of reproducible encoding units and the number of playback encoding units.

In FIG. 7, a thick line denotes the manner of change in the numbers of playback encoding units W from block to block in case the processing is made in accordance with the flowchart shown in FIG. 9. In FIG. 8, similarly to FIG. 6, the normalization coefficients, the number of playback encoding units W and the number of reproducible encoding units V are shown for the blocks N1, N2, N3, N4 and N5 of FIG. 7.

That is, with the method shown in the flowchart of FIG. 9, once the number of W0 is set, the number of playback encoding units is not increased until the next value of W0 is set. It is when the number of reproducible encoding units becomes smaller than the minimum value of the number of reproducible units following the setting of the value W0 in W that the number of playback encoding units W is changed. This stabilizes the playback bandwidth and enables prevention of occurrence of the harsh sounding noise caused by appearance and disappearance of high-range signals. On the other hand, if the pre-set value X0 is set to a sufficiently small value, the high-range signal level is reduced to an extremely small value even if the bandwidth is increased with the value of W0 being again set in W, so that there is not produced an alienated sensation caused by the apparent increase in bandwidth.

Figure 10:
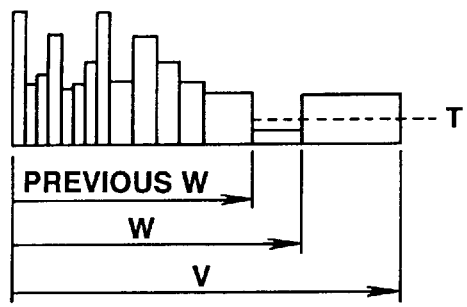
FIG. 10 illustrates another example of the relation between the normalization coefficients of the encoding units of the respective blocks, number of reproducible encoding units and the number of reproduced encoding units.

As a modification of the above process of the method of the present invention, it is also possible to check whether or not the high-range side signal level has become smaller in its entirety than a pre-set level and to increase the number of playback encoding units W only gradually in case of the affirmative result of check in meeting with the attenuated bandwidth as shown in FIG. 10 without setting the value W to the default value W0.

However, with the method of increasing the bandwidth as shown in FIG. 8, bandwidth increase may be controlled more easily and the playback bandwidth may be determined more stably than with the bandwidth increasing method shown in FIG. 10. Since high frequency components are attenuated in many cases in actual acoustic signals, the bandwidth increase control method shown in FIG. 8 is more effective in easily realizing encoding which produces less of an alienated hearing sensation.

Figure 11:
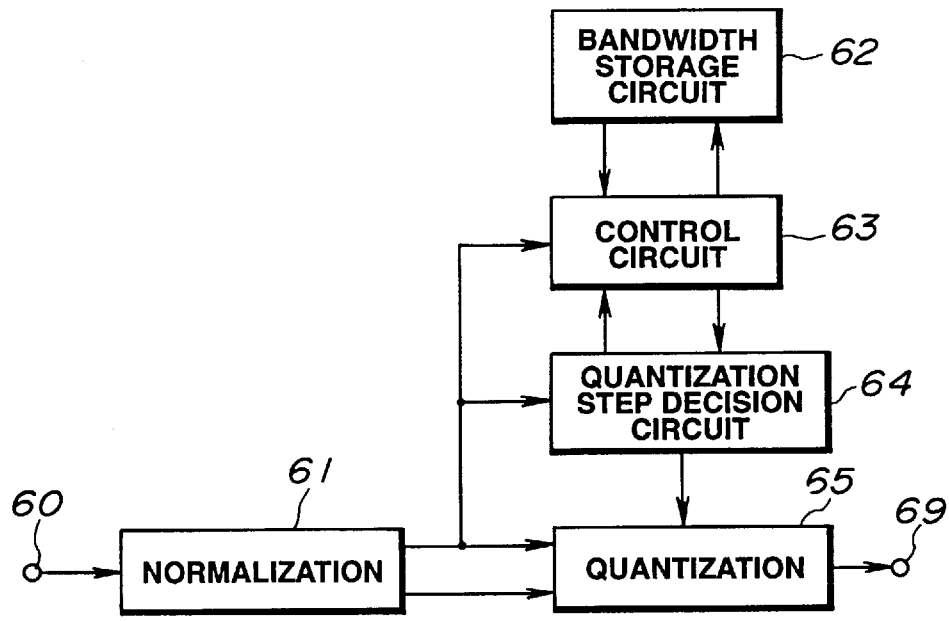
FIG. 11 is a block circuit diagram showing another illustrative example of a signal component encoding circuit of a high efficiency encoding device of FIG. 1.

FIG. 11 shows an illustrative arrangement of the signal component encoding circuit 12 which is shown in FIG. 1 and which is configured for implementing the high-efficiency encoding method described above. The arrangement of FIG. 11 includes the following modifications of the general construction shown in FIG. 3.

That is, the signal component encoding circuit (frequency component signal encoding means) shown in FIG. 11 includes a bandwidth storage circuit 62 as bandwidth information holding means for holding the playback bandwidth information of the previous block (the information of the bandwidth for which bit allocation has been performed, that is the value of the number of the playback encoding units in the embodiments of FIGS. 8 and 10, and a control circuit 63 as bandwidth decision means for deciding the number of the playback encoding units of the current block based upon the playback bandwidth information (value of the number of playback encoding units) in the previous block held by the bandwidth storage circuit 62.

Referring to FIG. 11, the respective frequency component signals, supplied from the converting circuit 11 of FIG. 1 via an input terminal 60, are sent to a normalization circuit 61. The normalization circuit 61 normalizes the number of frequency component signals from the transform circuit 11 of FIG. 1 from a pre-set band to another and outputs the normalization coefficient information and the normalized frequency components. The normalization coefficient information and the normalized frequency components are sent to a quantization circuit 65. The normalization coefficient information from the normalization circuit 61 is sent to a quantization step decision circuit 64 and a control circuit 63. The quantization step decision circuit 64 quantizes the quantization step of each encoding unit on the block basis and calculates the number of reproducible encoding units V based upon the calculated quantization fineness of each encoding unit.

In the bandwidth storage circuit 62 is stored the number of playback encoding units W up to the current time point. The control circuit 63 decides the number of reproducible encoding units sent from the quantization step decision circuit 64 and the information on the number of playback encoding units w and the information on the normalization coefficient information supplied from the bandwidth storage circuit 62.

The control circuit 63 sends the information on the number of the playback encoding units w thus set and control signals to the quantization fineness decision circuit 64. The quantization step decision circuit 64 re-allocates bits so far allocated to high-range side (V-W) encoding units within a number of the playback information units now set in order to set the ultimate bit allocation.

The quantization circuit 65 quantizes spectral signals from one encoding unit to another based upon the quantization fineness information. An output of the quantization circuit 65 includes the normalization coefficient information and the quantization fineness information in addition to the normalized and quantized spectral signals. An output of the quantization circuit 65 is sent via an output terminal 69 to the code string generating circuit 13 shown in FIG. 1.

The information on the number of playback information units, decided by the control circuit 63, is also sent to the bandwidth storage circuit 62 for storage therein for subsequent block-based processing.

With the above-described high efficiency encoding method of the present invention, since the current playback bandwidth is decided by having reference to the number of playback encoding units in the past, that is to the playback bandwidth information in the past, the playback bandwidth is stabilized, such that it becomes possible to prohibit the occurrence of harsh noise otherwise caused by appearance and disappearance of high-range signal components. On the other hand, since bandwidth increase occurs after sufficient attenuation of the high-range side signals, it becomes possible to suppress an alienated hearing sensation otherwise produced by bandwidth switching.

Although the above description has been made with reference to transform of an input waveform signal into spectral signal components by bandwidth splitting by a band-splitting filter and by orthogonal transform, the encoding method of the present invention may naturally be employed for a case in which the input waveform signal is transformed by solely the orthogonal transform without employing the band-splitting filter. The present encoding method may also be realized for a case in which the method including orthogonal transform, such as DFT, DCT or MDCT is not used but the encoding unit is constituted by each band split from the frequency spectrum by e.g., a band-splitting filter.

In addition, although the above description is directed to the case in which the playback bandwidth is set by the number of playback units, the playback range may be similarly controlled in the same way as explained with reference to FIGS. 7 to 9 when the spectral signals are separated into tonal signals and non-tonal signals and the tonal signals are encoded separately from the non-tonal signals, as disclosed in the U.S. patent application Ser. No. 08/374,518 filed by the present Assignee n May 31, 1994 and in corresponding European Laid-Open Patent 0,653, 846, as reference above. In such case, the playback bandwidth information and the reproducible band information prescribing the playback bandwidths for the tonal and non-tonal signals are used in place of the information on the number of encoding units.

Although the foregoing description has been centered around the application of the encoding method of the present invention to acoustic signals, the encoding method of the present invention may also be applied to encoding of waveform signals in general. However, the present invention may be applied most effectively to acoustic signals since then it becomes possible to eliminate the harsh sounding noise.

According to the present invention, since the bandwidth of each block is determined by having reference to the bandwidth determined in the previous block, stable playback bandwidth may be produced such that the playback frequency bands are not frequently changed from block to block. Thus there is no risk of the harsh sounding noise being produced as a result of appearance and disappearance of high range signals, such that it becomes possible to suppress the deterioration in the perceived sound even with an insufficient bit rate.

What is claimed is:

1. A high efficiency encoding method, comprising the steps of:
    dividing the speech signal into blocks, each block consisting of plural frequency component signals;
    determining a bandwidth over which to perform bit allocation based upon bandwidths from previous blocks, and upon the plural frequency component signals of the current block; and
    encoding the frequency component signals of the current block which lie within the determined bandwidth.

2. The high efficiency encoding method as claimed in claim 1, wherein said blocks consisting of plural frequency component signals are an orthogonal transform of a temporal signal.

3. The high efficiency encoding method as claimed in claim 1, wherein the determination of bandwidth in which to perform bit allocation is made based upon the bandwidth of the previous block.

4. The high efficiency encoding method as claimed in claim 1, wherein when a level of frequency component signals in an enlarged frequency band is smaller than a pre-set value, the bandwidth in which to perform bit allocation for the current block is increased.

5. The high efficiency encoding method as claimed in claim 1, wherein when a level of frequency component signals of a range higher than the bandwidth of bit allocation performed on the previous block is smaller than a pre-set value, the bandwidth of bit allocation in said current block is increased.

6. A high efficiency encoding device comprising block frequency component signal generating means for splitting a waveform signal into blocks each including plural frequency component signals, and frequency component signal encoding means for encoding the frequency component signals in said blocks, in which, when encoding the frequency component signals in said blocks, the bandwidth of block-based bit allocation is varied in dependence upon characteristics of the waveform signal, wherein said frequency component signal encoding means comprises:
    bandwidth information holding means for holding the information on the bandwidth of bit allocation performed on temporally previous plural blocks; and
    bandwidth decision means for deciding the bandwidth of bit allocation of the current block based upon the information on the bandwidth of bit allocation in said previous blocks held by said bandwidth information holding means.

7. The high efficiency encoding device as claimed in claim 6, wherein said bandwidth decision means makes decisions on the bandwidth of bit allocation performed in the current block based upon the information on the bandwidth of the block which permits bit allocation.

8. The high efficiency encoding device as claimed in claim 6, wherein when the frequency component signal level of a band of an increased bandwidth is lower than a pre-set level that, the bandwidth decision means increases the bandwidth of bit allocation in said current block, and wherein when the bit requirement for reproducibly coding the bandwidth of said current block is greater than a pre-set level that, the bandwidth decision means decreases the bandwidth of bit allocation.

9. The high efficiency encoding device as claimed in claim 6, wherein when the bit requirement for reproducibly coding the bandwidth of said current block is greater than a pre-set level, the bandwidth decision means decreases the bandwidth of bit allocation, and wherein when the frequency component signal level in a band higher than the bandwidth of bit allocation performed in the previous block is smaller than a pre-set value, the bandwidth decision means increases the bandwidth of bit allocation in said current block.

* * * * *